Dec. 20, 1955     R. E. REEVE     2,727,491
MILK TRANSFER UNIT FOR AUTOMATIC MILKING MACHINE
Filed June 29, 1953     2 Sheets-Sheet 1

INVENTOR
Robert E. Reeve
BY
ATTORNEYS

United States Patent Office 2,727,491
Patented Dec. 20, 1955

2,727,491

MILK TRANSFER UNIT FOR AUTOMATIC MILKING MACHINE

Robert E. Reeve, Tracy, Calif.

Application June 29, 1953, Serial No. 364,560

7 Claims. (Cl. 119—14.54)

This invention relates generally to improvements in a milking machine of the continuous or pipe line type; i. e. wherein milk from the teat cup assembly delivers through a transfer unit, suspended from the cow, to a milk hose, and from the latter feeds—under vacuum—in a conduit system leading to a central receiving station in or adjacent the dairy barn.

One of the important objects of the present invention is to provide, in an automatic milking machine, a novel milk transfer unit; the unit having a configuration, and being of sufficient weight when suspended from a cow, to hang in a well balanced manner so as to permit of the desirable pull or tug on the teat cup assembly when the latter is in operation.

Another object of this invention is to provide a milk transfer unit which is simplified with respect to the structure employed to transfer the milk through said unit from the teat cup assembly to the milk hose; the arrangement being such that the quantity of milk present at any time in the unit is very small, so that there is no appreciable variance in the weight of the unit as the milk flows therethrough.

An additional object of the instant invention is to provide a milk transfer unit which includes means to prevent the occurrence of any dead vacuum in said unit, and which would hinder proper flow of the milk therethrough; such means being a porting which permits the entry of air into the milk transfer unit so as to break any dead vacuum therein, and to create turbulence of the flowing milk, which turbulence aids in the free delivery of the milk from said unit to and through the milk hose.

A further object of the invention is to provide a milk transfer unit which embodies novel means for engaging and releasably supporting the teat cups on the top of the unit when it is not in use, or when it is being applied to or removed from the cow; this feature preventing the teat cups from depending from the unit into contact with the floor or ground, with possible contamination.

A separate object of the invention is to provide a milk transfer unit which omits the pulsator usually mounted directly on the unit, or on the pail in pail-type machines. Instead, the present invention contemplates a common source of pulsating vacuum at the aforesaid central station, and to which source all of the milk transfer units, of the milking system, are connected in communication. This avoids the necessity of initial purchase and subsequent maintenance of a number of separate pulsators.

It is also an object of the invention to provide a milk transfer unit, of simple but sturdy construction, designed for ease and economy of manufacture; convenience of handling; effective and positive operation; and ready cleansing.

Still another object of the invention is to provide a practical and reliable milk transfer unit, and one which will be exceedingly effective for the purpose for which it is designed.

These objects are accomplished by means of such structure and relative arrangement of parts as will fully appear by a perusal of the following specification and claims.

Figure 1:
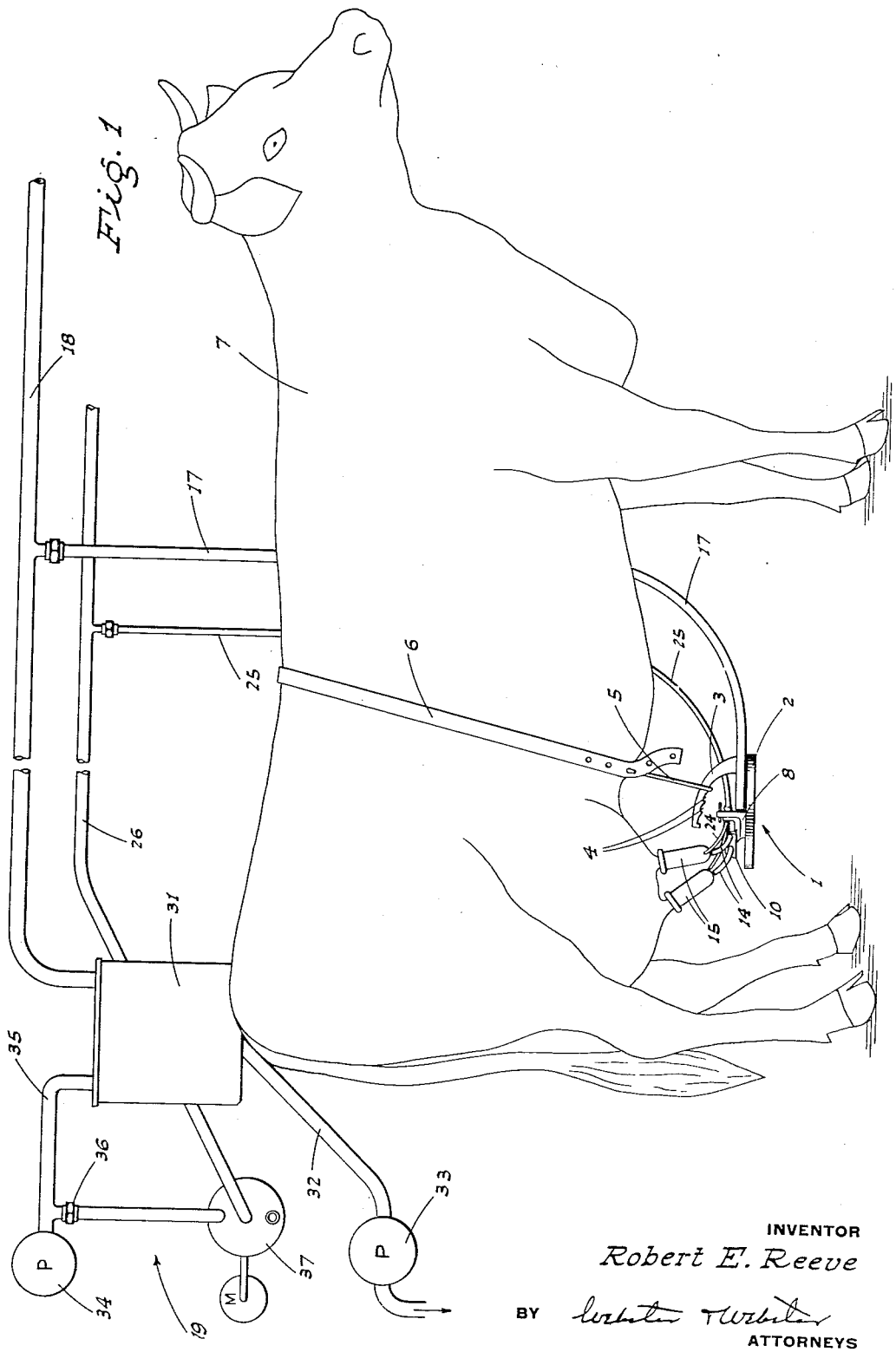
Fig. 1 is a side elevation of the improved milk transfer unit as suspended from a cow, and in use; the view additionally showing—diagrammatically—the pipe line system including the central source of pulsating vacuum.

Referring now more particularly to the characters of reference on the drawings, the improved milk transfer unit is indicated generally at 1, and comprises a flat, relatively thin but heavy body 2 of banjo shape. Such body is formed at its forward end which is the neck portion—with an integral suspension handle 3 which extends upwardly and rearwardly in spaced overhanging relation to said body.

On the under side thereof the suspension handle 3 is formed with a longitudinal row of notches 4, and such handle—when the milk transfer unit 1 is in use—engages through, and suspends said handle from, an inverted bail 5 vertically adjustably carried on a surcingle 6 which extends over the back of the cow 7. The milk transfer unit 1 may be effectively balanced—to position it horizontally—by selecting one of the notches 4 for engagement with the inverted bail 5.

The body 2 and suspension handle 3 are of integral cast metal construction; the body on the enlarged portion thereof being fitted on top with a milk transfer block 8 secured to the body by transversely spaced screws 9.

At the rear end thereof the milk transfer block 8 is formed with an integral, upwardly and rearwardly inclined, fan-shaped flange 10; i. e., a flange which is substantially semi-circular in plan.

The fan-shaped flange 10 is formed, in equally circumferentially spaced relation, with four substantially radial passages 11, which passages extend from the outer edge of said flange inwardly to communication in common with a central longitudinal passage 12 in the milk transfer block 8.

A corresponding number of fittings 13 engage in the outer end portions of the passages 11 and project outwardly to beyond the periphery of the flange 10. These projecting fittings 13 couple to the flexible, vacuum tubes 14 which lead to, and connect with, the corresponding teat cups 15 of the teat cup assembly; the latter being conventional.

Another fitting 16 engages in the forward end portion of the central longitudinal passage 12 and projects ahead of the milk transfer block 8, being coupled to the flexible, milk hose 17. The milk hose 17 leads to connection with a milk delivery pipe 18 whose purpose is to convey the milk under vacuum to a central receiving station, indicated generally at 19, and to which reference will hereinafter be made in greater detail.

An air bleed passage or port 20 extends from the outside of the milk transfer block 8 through the latter and into communication with the central longitudinal passage 12.

The milk transfer block 8 is formed at the forward end with a central upstanding bracket 21, and a manifold pipe 22 is disposed lengthwise above the block 8, extending through and projecting beyond the bracket 21; the latter forming a rigid support for said manifold pipe.

The manifold pipe 22, which is closed at its rear end, is formed on each of its sides with a pair of laterally projecting fittings 23. The flexible vacuum tubes 24 of the teat cup assembly connect in communication between said lateral fittings 23 and the corresponding teat cups 15.

The projecting forward end of the manifold pipe 22 is coupled to a flexible, vacuum hose 25 which leads from the milk transfer unit 1 to connection with a pulsating vacuum pipe 26 which likewise has its inception at the central receiving station 19; the vacuum in the pipe 26 being pulsated in the manner as will hereinafter appear.

The milk transfer block 8 is formed, at its two forward corners, with transversely spaced, relatively short posts 27, and each of such posts provides the support for a generally J-shaped rod 28; such rods being disposed horizontal, and with the longest leg innermost and projecting through—and to a point rearwardly of—the related post 27 in fixed relation to the latter. With the J-shaped rods 28 so mounted their tips 29 and 30 are exposed and project rearwardly in a plane above the remainder of the parts of the milk transfer unit 1.

Figure 2:
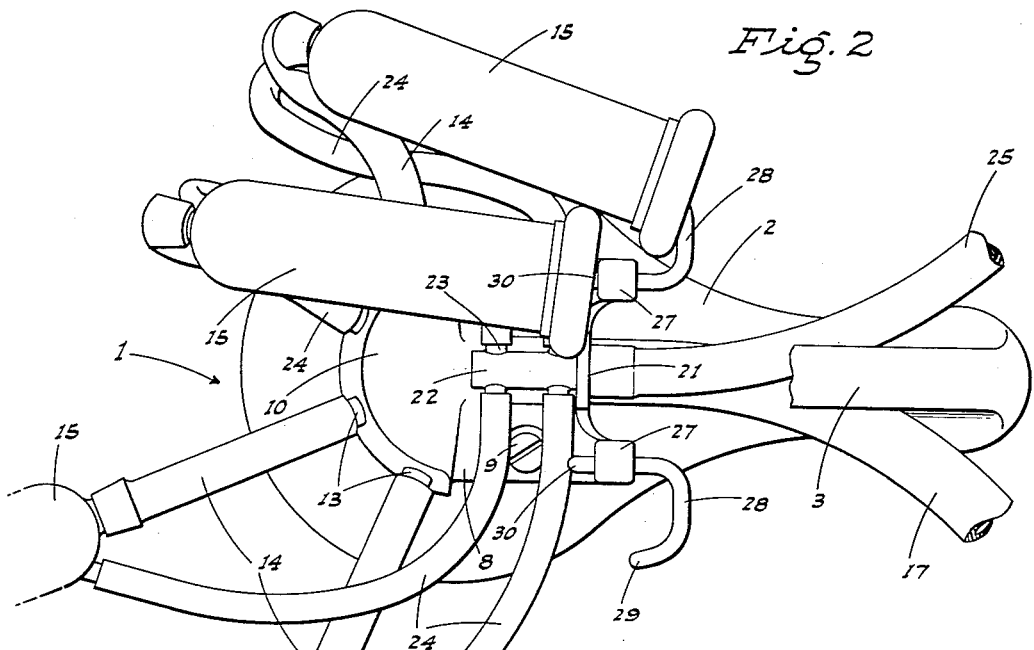
Fig. 2 is an enlarged top plan view of the milk transfer unit; two of the teat cups being shown in their position of engagement and support above said unit.
Figure 3:
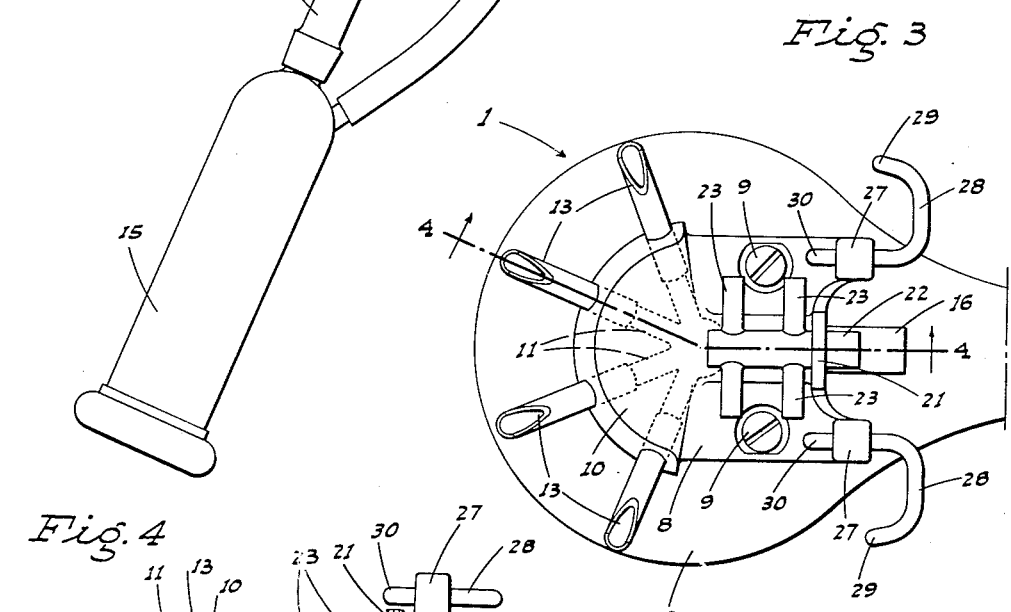
Fig. 3 is a similar view, on reduced scale, but with the teat cup assembly detached.
Figure 4:
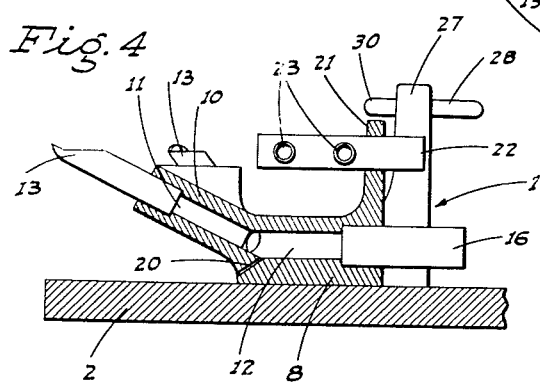
Fig. 4 is a fragmentary sectional elevation on line 4—4 of Fig. 3.

When such unit 1 is being suspended on or removed from the cow; when being transported; or when not in use, the then detached teat cups 15 are doubled forwardly on the connecting hoses 14 and 24, and are engaged on corresponding ones of said tips in the manner of the two uppermost teat cups, as in Fig. 2. With this arrangement the teat cups 15 can be readily attached to, or detached from, the top of the milk transfer unit 1, being thus maintained in an uppermost, out-of-the-way position, and so that they cannot possibly depend into floor or ground engagement.

With the milk transfer unit 1 suspended from a cow in the manner shown in Fig. 1, with the teat cup assembly engaged with the cow's teats, and with the milk hose 17 and vacuum hose 25 coupled to the milk delivery pipe 18 and pulsating vacuum pipe 26, said unit functions in the following manner:

The pulsating vacuum from pipe 26 is imposed through the medium of the vacuum hose 25, manifold pipe 22, and vacuum tubes 24 on the respective teat cups 15, causing functioning of the latter.

Upon the milk flowing from the teat cups 15 it is carried by the milk tubes 14, through the passages 11, and into the central longitudinal passage 12 under the influence of the vacuum constantly imposed on said passage 12 from the milk delivery pipe 18 by the milk hose 17. Thus, the milk flows from said passage 12 through hose 17, and into the milk delivery pipe 18.

During this operation there is a constant feeding or bleeding of air through the small passage or port 20 into the central longitudinal passage 12. Such air entry into passage 12 prevents the occurrence of any dead vacuum in the milk transfer block 8, and creates sufficient turbulence that there is free flow of the milk through said milk transfer block 8, as well as through the milk hose 17.

By reason of the particular construction of the milk transfer block 8, and especially the passage formation therein, no substantial quantity of milk is present in said milk transfer block at any time during operation of the milk transfer unit; the advantage being that the weight of such unit does not vary appreciably, as is the case when the milk transfer unit is of pail type. With this advantageous feature, together with the fact that the milk transfer unit 1 is relatively heavy and capable of a fine balance from the inverted bail 5, such milk transfer unit can be set to impose the desired tug or pull—as is desired—on the teat cup assembly during the course of a milking operation.

In addition to its simplicity of construction the milk transfer block 8 is capable of ready cleansing between milking operations; this because such block includes merely a simple inter-branched passage arrangement therein, and without the inclusion of parts having seals etc. which would require removal for cleansing and sterilization.

A further advantage of the described milk transfer unit 1 is that it is relatively shallow in depth—i. e. in top to bottom dimension—so that it can be used effectively, and without floor contact, on cows having very low udders.

The upwardly and rearwardly inclined fan-shaped flange 10 is advantageous for the reason that it maintains the fittings 13 spaced above the body 2 a distance for easy attachment of the milk tubes 14 on said fittings.

The central receiving station, located in or adjacent the dairy barn, and to which station the pipes 18 and 26 lead, comprises—diagrammatically—the following:

The milk delivery pipe 18 discharges into a milk receiving tank 31; the latter including a bottom discharge conduit 32 which couples to a pump 33. The pump 33 functions to withdraw milk from the tank 31, yet without breaking the vacuum which exists in the latter. The tank 31 and the milk delivery pipe 18 are maintained under constant vacuum by means of an electric motor driven vacuum pump 34 connected to said tank 31 by a conduit 35.

The pulsating vacuum pipe 26 also leads to connection with the vacuum conduit 35 at a fitting 36, and an electric motor driven, rotary pulsating valve 37 is interposed in said pipe 26. The rotary valve 37 is operative to alternately establish communication of pipe 26 with conduit 35 and with atmosphere. The result is that the vacuum in pipe 26 pulsates, as is necessary to the proper operation of the teat cups 15, and which teat cups have connection with said pipe 26 through the medium of the vacuum hose 25, manifold pipe 22, and flexible tubes 24. With this arrangement, only a single pulsating mechanism is required, eliminating the necessity of separate pulsators on each of the milk transfer units 1.

From the foregoing description it will be readily seen that there has been produced such a device as substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired.

1. A milk transfer unit including a body adapted for surcingle suspension beneath a cow in adjacent relation to a milk hose under vacuum, a vacuum hose, and a teat cup assembly having milk tubes and vacuum tubes, all being flexible; a milk transfer block on top of the body, the block having a passage therein, the passage having branches corresponding in number to the milk tubes, a fitting on the block in communication with said passage and adapted to couple to the milk hose, fittings on the block in communication with said branches and adapted to couple to corresponding milk tubes, a vacuum manifold on the block, and a plurality of fittings on and in communication with said manifold in corresponding relation to and for coupling with said vacuum hose and vacuum tubes; the block having an air entry opening, of limited diameter, extending from atmosphere to said passage.

2. A milk transfer unit including a body adapted for surcingle suspension beneath a cow in adjacent relation to a milk hose under vacuum, a vacuum hose, and a teat cup assembly having milk tubes and vacuum tubes, all being flexible; a milk transfer block on top of the body, the block having a passage therein, the passage extending longitudinally in the block and having branches in the rear portion of said block, said rear portion being a flange which extends at an upward and rearward incline in overhanging relation to the body, the branches in said flange corresponding in number to the milk tubes, rearwardly projecting fittings on the flange in communication with said branches and adapted to couple to corresponding milk tubes, a forwardly projecting fitting on the block at the front in communication with the passage and adapted to couple to the milk hose, a vacuum manifold on the block, and a plurality of fittings on and in communication with said manifold in corresponding relation to and for coupling with said vacuum hose and vacuum tubes.

3. A milk transfer unit, as in claim 2, in which said flange is part-circle in plan with the convex edge rearmost; the related fittings projecting substantially radially from said edge.

4. A milk transfer unit including a body adapted for surcingle suspension beneath a cow in adjacent relation to a milk hose under vacuum, a vacuum hose, and a teat cup assembly having milk tubes and vacuum tubes, all being flexible; passage means on the body including fittings adapted to couple the milk hose in communication with the milk tubes, and the vacuum hose in communication with the vacuum tubes; and elements secured in connection with the body above the same and clear of said fittings adapted to releasably engage and support corresponding teat cups of said assembly when not in use.

5. A milk transfer unit including a body adapted for surcingle suspension beneath a cow in adjacent relation to a milk hose under vacuum, a vacuum hose, and a teat cup assembly having milk tubes and vacuum tubes, all being flexible; a milk transfer block on top of the body, the block having a central longitudinal passage therein, upstanding transversely spaced posts at the front corners, and a central bracket upstanding between said posts; a plurality of fittings in communication with said passage and projecting from the block in corresponding relation to and for coupling with said milk hose and milk tubes, a longitudinal manifold supported by the bracket, a plurality of fittings on and in communication with said manifold in corresponding relation to and for coupling with said vacuum hose and vacuum tubes, and projecting elements on the posts and clear of the fittings adapted to releasably support corresponding teat cups of said assembly when not in use.

6. A milk transfer unit as in claim 4 in which the elements comprise fixed double-ended rods, each end of each rod having a projecting unobstructed tip to enter the outer end of a teat cup in supporting relation.

7. A milk transfer unit as in claim 4 in which each teat cup supporting element comprises a fixed rod having an unobstructed substantially horizontal end tip arranged to enter the outer end of such teat cup in supporting relation.

References Cited in the file of this patent

UNITED STATES PATENTS

| | | |
|---|---|---|
| 1,417,801 | Cook | May 30, 1922 |
| 1,559,315 | Daysh | Oct. 27, 1925 |
| 1,798,413 | Graves | Mar. 31, 1931 |
| 1,977,511 | Graves | Oct. 16, 1934 |
| 2,518,589 | Anderson | Aug. 15, 1950 |
| 2,543,162 | Floerke | Feb. 27, 1951 |
| 2,613,636 | Babson | Oct. 14, 1952 |
| 2,628,589 | Reeve | Feb. 17, 1953 |

FOREIGN PATENTS

| | | |
|---|---|---|
| 171,749 | Great Britain | Nov. 14, 1921 |
| 562,105 | Germany | Nov. 3, 1932 |
| 557,140 | Great Britain | Nov. 5, 1943 |